United States Patent

[11] 3,632,291

| [72] | Inventors | Raymond Defago<br>Riehen;<br>Alfred Litzler, Itingen; Jean Hertig; Hans-Joerg Angliker, both of Basel; Hans Wilhelm Liechti, Oberwil/Basel, all of Switzerland |
|---|---|---|
| [21] | Appl. No. | 802,224 |
| [22] | Filed | Feb. 25, 1969 |
| [45] | Patented | Jan. 4, 1972 |
| [73] | Assignee | Ciba Limited<br>Basel, Switzerland |
| [32] | Priority | Feb. 26, 1968 |
| [33] | | Switzerland |
| [31] | | 2724/68 |

[54] TRANSFER PRINTING
12 Claims, No Drawings

[52] U.S. Cl. ................................................. 8/2.5,
8/1 B, 8/1 E, 8/1 K, 8/1 M, 8/1 L, 8/21 B, 8/41 B, 8/41 C, 8/41 A, 8/163, 8/176, 117/36.1, 101/470

[51] Int. Cl. ................................................. D06p

[50] Field of Search ................................. 8/2.5, 1.2, 1 B, 1 E, 1 K, 1 M, 1 L, 176; 101/470, 469; 117/36.1

[56] References Cited
UNITED STATES PATENTS

| 3,210,544 | 10/1965 | Marx | 101/470 X |
| 3,245,796 | 4/1966 | Burg | 96/67 |
| 3,280,735 | 10/1966 | Clark et al. | 101/470 |
| 3,363,557 | 1/1968 | Blake | 101/470 |
| 3,454,764 | 7/1969 | Collier | 101/470 |
| 3,359,112 | 12/1967 | Goldberg et al. | 96/102 |

FOREIGN PATENTS

| 1,223,330 | 2/1960 | France | 8/2.5 |
| 1,052,625 | 12/1966 | Great Britain | 8/2.5 |

OTHER REFERENCES

Fox, J. Soc. Dyers & Col., Feb. 1965, pages 45–51
Keaton, Jour. Soc. Dyers & Colorists, page 312–322
Tullio, American Dyestuff Rep., 5/23/66 pages 45–52

*Primary Examiner*—D. Levy
*Attorneys*—Harry Goldsmith, Joseph G. Kolodny, Bryant W. Brennan and Edward J. Sites

ABSTRACT: A dyeing or printing process wherein a natural or synthetic polyamide material or other material made from a linear, fiber-forming polymer is dyed or printed according to the transfer printing process with a fiber-reactive organic dyestuff that sublimes at a temperature below 240° C.

TRANSFER PRINTING

British Pat. specification No. 1,052,625 discloses a process wherein colored prints produced with sublimable dyestuffs can be transferred to anodized aluminum on a support.

In French Pat. specification Nos. 1,223,330 filed by Filatures Prouvost Masurel & Cie., Roubaix, France, and 1,334,829 filed by Imperial Chemical Industries Ltd. it is disclosed that this method of transfer printing is also suitable for coloring synthetic material, especially textile material made from linear polyesters. It is known that transfer printing does not produce satisfactory prints on natural materials, for example, wool and cotton. Furthermore, it is essential that the dyestuffs used be very carefully selected to ensure satisfactory and trouble-free transfer of the prints produced with the sublimable dyestuffs from the support to the material to be printed; the dyestuffs used must display very similar sublimation behavior, otherwise the prints will lack sharpness. Good reproducibility also depends very much on adherence to operating conditions. These known disadvantages of the transfer printing process are largely overcome by the new process described herein.

This invention provides a process wherein natural or synthetic polyamide materials, especially textile materials, may be colored by the transfer printing process by means of organic, fiber-reactive dyestuffs which sublime at a temperature below 240°C., preferably at a temperature below 200 °C.

Fiber-reactive dyestuffs that may be used in the process according to this invention are the so-called "disperse" dyestuffs that sublime almost completely under atmospheric pressure at temperatures below 240°C., or that have a vapor pressure at 200° C. which is higher than $10^{-5}$ mm./Hg, or preferably higher than $10^{-4}$ mm./Hg. They may belong to a very wide variety of chemical classes; for example, the perinone, quinophthalone, acridine, xanthone, diazine or oxazine series, and advantageously the anthraquinone or azo series. Nitro dyestuffs and styryl dyestuffs may also be used. These disperse dyestuffs are free from acidic groups imparting solubility in water, especially sulfonic acid groups, and contain a fiber-reactive grouping. Such groupings are, for example, the epoxy grouping, unsaturated aliphatic acyl residues, for example, propiolic, acrylic, chloroacrylic, chlorocrotonic and chloromaleic acid residues, and also the vinyl-$SO_2$ grouping. However, the dyestuffs advantageously contain fiber-reactive groupings having replaceable substituents, for example, sulfonic acid-N,$\beta$-chloroethylamide groups,$\beta$-chloroethylsulfonyl groups, acyl residues derived from aliphatic halogeno-carboxylic acids, especially chloroacetyl, $\beta$-chloropropionyl,$\alpha$, $\beta$-dibromopropionyl and dichloropropionyl residues, and also cyclic fiber-reactive substituents of the aromatic, and especially the heterocyclic, series, for example, the nitrochlorobenzene-sulfonyl and nitrochlorobenzoyl groupings, chlorobenzdiazole, monohalogeno- and dihalogeno-1,3,5-triazinyl groups, dichloro- and trichloro-pyrimidyl groups, diazine and triazine residues containing replaceable sulfonyl groupings, chloropyridazine residues and the like.

These fiber-reactive substituents are bound to an aromatic ring in the dyestuff molecule, either directly or by way of a bridging atom or group, especially an oxygen, sulphur or nitrogen atom, or a sulphamide or carbamide group. Dyestuffs of the kind defined have frequently been described in the literature, for example, in French Pat. specification Nos. 1,198,423, 1,189,668, 1,274,098 and 1,276,443 and in British Pat. specification Nos. 850,977, 862,269 and 825,377; they may be manufactured by known methods. Generally, the sublimable dyestuffs to be used in accordance with the invention have a molecular weight below 650.

British Pat. No. 850,977 shows a water-insoluble anthraquinone dyestuff containing at least one halogenalkoxy or halogenoalkylamino group which is directly attached to a carbon atom of the anthraquinone nucleus or is attached to a carbon atom of the anthraquinone nucleus through an alkoxy, alkylamino or arylamino radical. The halogenoalkoxy or halogenalkylamino groups present in the water-insoluble anthraquinone dyestuffs may be further substituted by hydroxy, alkoxy or hydroxyalkoxy substituents which are attached to the carbon atoms present in the said groups.

British Pat. No. 862,269 shows water-insoluble azo dyestuffs, which are free from sulfonic acid, carboxylic acid and acylsufonamido groups, and which contain not more than one phenolic hydroxyl or enolisable carbonyl group and which contain at least one group of the formula $-SO_2NRR^1$ each of which is directly attached to a different aryl nucleus present in the azo dyestuff, wherein R represents a chloro- or bromo-alkyl or chloro- or bromo-cycloalkyl radical, R represents a hydrogen atoms or a substituted or unsubstituted hydrocarbon radical or a chloro- or bromo-alkyl or chloro- or bromo-cycloalkyl radical or R and $R^1$ are joined together to form with the nitrogen atom a heterocyclic ring containing a chlorine or bromine atom. Haloethyl- and gama-halo-beta-hydroxyl propyl radicals exemplify these radicals.

British Pat. No. 825,377 shows water-insoluble dyestuffs of the formula:

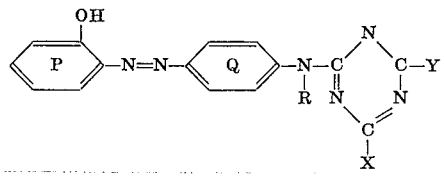

wherein R stands for hydrogen or a hydrocarbon radical which may be substituted, X stands for halogen, Y stands for substituted or unsubstituted alkyl or aryl radicals or for hydroxyl, amino, or for an organic radical containing a nitrogen, oxygen or sulfur atom through which it is linked to the triazine ring, and the benzene rings P and Q may be substituted, provided that R, Y and the benzene rings P and Q are free from sulfo, sulfato or carboxy groups.

French Pat. No. 1,276,443 shows haloacetylamino-azo-5-pyrazolone dyes.

French Pat. No. 1,198,423 and French Pat. show chlorotriazineazo dyes with

bridges between the chlorotriazine and azo dye.

French Pat. No. 1,274,098 shows 3-nitro-4-chlorophenyl reactive dyes with the latter chlorine atom labile.

The said sublimable, fiber-reactive disperse dyestuffs may be applied according to the process normally adopted in transfer printing. The dyestuffs, in the form of aqueous, organic/aqueous or purely organic anhydrous inks, are first applied to a support (metal foil or continuous length of paper), if desired by the processes used in the production of multicolored designs or motifs, and then dried. To effect the actual transfer, the support thus printed is brought into contact with the natural or synthetic polyamide material to be printed and kept at the sublimation temperature until the design or motif applied to the support has been transferred to the polyamide material. This can generally be achieved by a short period of heating (10 to 60 seconds) at a temperature of 150 ° to 220°C. The transfer printing process may be carried out continuously on a heated roller or by means of a heated plate (smoothing iron or hot press) or with the use of steam or dry, warm air under atmospheric pressure or in vacuo. It is generally not necessary to subject the printed polyamide material to an aftertreatment, for example, washing or steaming, either to fix the dyestuffs on the printed material or to remove any unfixed dyestuff.

The process in accordance with this invention is suitable for printing natural and synthetic polyamide materials, for example, all-wool and all-polyamide materials as well as union materials comprising blends of these two types of fiber, and also union materials containing other synthetic or natural fibers. The polyamide materials to be colored may be in the form of woven, knitted or nonwoven fabrics or in the form of sheets or films.

The prints obtained generally possess excellent properties of fastness. According to this process, even dyestuffs having sublimation properties that are not very similar yield better results than conventional transfer printing processes in which fiber-reactive disperse dyestuffs are not used. The operating conditions are otherwise the same as in known transfer printing processes. For example, identical or different motifs in identical or different shades can be printed either simultaneously or successively on both sides of a woven, knitted or nonwoven material or a foil.

The following examples illustrate the invention. The parts and percentages are by weight unless otherwise stated. The relationship between parts by weight and parts by volume is the same as that between the gram and the milliliter

EXAMPLE 1

To print a red pattern on a union fabric made from wool and polyhexamethylene-adiphamide, an ink is first prepared in the following manner: 6 parts of 1-(2-chloro-4-nitrophenyl-azo)-4-N-ethyl-N-chloroacetoxyethylaminobenzene are dispersed with 6 parts of triacetyl cellulose in 89 parts of a solvent mixture containing mainly methylene chloride and isopropyl or ethyl alcohol. The pattern is printed by means of one or more rollers on a continuous length of paper or a thin aluminum foil with the ink so obtained, and the print is dried.

The printed support so obtained and the union fabric to be printed are pressed together on a roller heated electrically to 215°C. After a contact period of 30 seconds, a red print having sharp lines is obtained on the union fabric.

Fast red prints may also be obtained on all-wool or all-polyhexamethylene-adiphamide material, whether it be in the form of a knitted fabric or a nonwoven fabric.

EXAMPLE 2

An ink is prepared with 30 parts of the fiber-reactive azo dyestuff mentioned in example 1 and 30 parts of locust bean flour in 1,000 parts of water. A length of paper provided with a silicone layer is printed with the ink so prepared in a manner such that the paper carries 250 parts of ink per square meter. The support so obtained is dried and then pressed on to a nylon fabric for 20 seconds by means of a metal plate heated to 220°C. A fast print is obtained.

EXAMPLE 3

Two parts of the yellow dyestuff of the formula

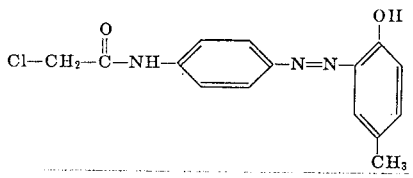

disclosed in British specification No. 879,263, published Oct. 11, 1961, are pasted with 4 parts of methyl ethyl ketone and stirred into a homogeneous paste with 82 parts of methyl ethyl ketone and 8 parts of ethyl cellulose type N. The batch is then diluted with a further 4 parts of methyl ethyl ketone.

The paste so obtained, which is ready for use, is applied to the support material in a thickness of 24μ by means of a hand coater, for example, type 3, or some other suitable coating device, and air dried. The support material may be, inter alia, calendered opaque cellulose (40 g./m.²) or aluminum foil.

The dyestuff can be transferred from the support material to the textile substratum by the action of dry heat for a short period. The dyestuff sublimes at 220°C. in 15 seconds and produces a covalent bond on nylon 66 knitted bathing suit material. The covalent degree of fixation of the transfer print obtained in this manner can be determined by extraction for 1 hour at the boil with a 1:1 mixture of dimethylformamide and water. The same support foil may also be used for printing wood fabrics. In this case, covalent fixation is effected, for example, in 30 seconds at 200 °C.

A yellow print may also be obtained in an analogous manner on a polyester fabric (polyethylene terephthalate), secondary acetate and triacetate fabrics and on polyacrylonitrile (Orlon 42) at a temperature of 200 °C. in all cases.

EXAMPLE 4

Transfer prints of equal quality in respect of shade, tinctorial strength and fastness properties may also be produced on polyamide 66 fabrics and wool with the dyestuff of the formula

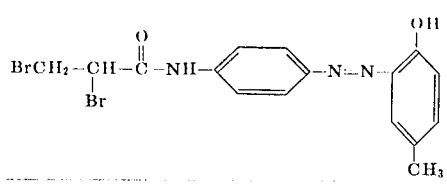

This dyestuff may also be used to produce transfer prints on polyester and polyacrylic fabrics.

EXAMPLE 5

Four parts of the yellow dyestuff synthesis thereof in French Pat. No. 1,198,423 example 2 of the formula

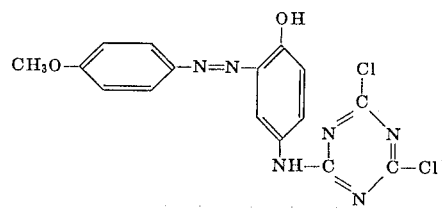

disclosed in example 2 of French Pat. No. 1,198,423 which was published on Dec. 7, 1959, are pasted with 6 parts of methyl ethyl ketone, and stirred into a homogeneous paste with 82 parts of methyl ethyl ketone and 8 parts of hydroxypropyl-cellulose.

The paste so obtained, which is ready for use, is applied to strips of paper in the manner described in the preceding example and air dried.

The dyestuff can be transferred from the paper to the substratum by being subjected to the action of dry heat for a short period. High-quality yellow prints may be obtained on polyamide 66 fabrics in 15 seconds at a temperature of 220 °C. The covalent degree of fixation of the transfer print obtained in the manner described is generally high and can be determined by extraction for one hour at the boil with a 1:1 mixture of dimethylformamide and water.

EXAMPLE 6

Violet transfer prints of great brilliance can be produced on nylon 66 textiles with the dyestuff of formula 1 below.

Reddish-brown prints may be obtained by using the dyestuff of formula 2.

(1)

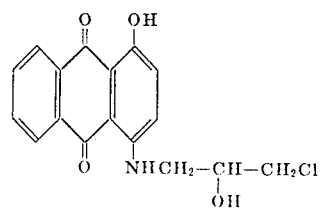

(2) 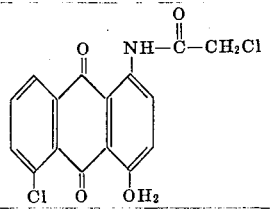

We claim:

1. A transfer printing process comprising applying a reactive dye which sublimes at temperature below 240° C. to a water insoluble support comprising a paper sheet, a sheet of paper coated with a silicone layer, a cellophane film or a metal foil, contacting a natural or synthetic textile therewith and heating to a high temperature the dye impregnated sheet to transfer the reactive dye to the textile.

2. A process as claimed in claim 1, wherein a fiber reactive dyestuff is used that sublimes below 200°C.

3. A process as claimed in claim 1, wherein a textile material made of or containing polyester, polyacrylic, cellulose secondary acetate or triacetate fibers is printed.

4. A process as claimed in claim 1, wherein a fiber reactive dyestuff is used which sublimes at a temperature within the range of from 150° to 200 °C. under atmospheric pressure or which has a vapor pressure of more than $10^{-5}$ mm./Hg at 200 °C.

5. A process as claimed in claim 4, wherein a fiber reactive disperse dyestuff is used which contains a haloalkylcarbonyl amino group of two–four carbon atoms.

6. A process as claimed in claim 4, wherein a fiber-reactive disperse dyestuff is used that contains labile halogen bound at a s-triazine nucleus.

7. A process as claimed in claim 1, wherein the water-insoluble support carries a thickening agent in addition to the dyestuff.

8. A process as claimed in claim 7, wherein a thickening agent is used which is soluble in an organic solvent.

9. A process as claimed in claim 7, wherein the thickening agent is a cellulose ether.

10. A process as claimed in claim 1, wherein wool or a synthetic polyamide or a union fabric containing wool and a synthetic polyamide, or a union fabric containing another natural or synthetic material is printed.

11. A process as claimed in claim 10, wherein the material to be printed is kept in contact with the dyestuff vapor for 20 to 120 seconds.

12. A process as claimed in claim 10, wherein the material to be printed is kept in contact with the dyestuff vapor for 20 to 120 seconds in vacuo.

* * * * *